United States Patent [19]

Shone et al.

[11] Patent Number: 4,625,390

[45] Date of Patent: Dec. 2, 1986

[54] TWO-STEP METHOD OF MANUFACTURING COMPRESSED BISMUTH-CONTAINING GARNET FILMS OF REPLICABLE LOW ANISOTROPY FIELD VALUE

[75] Inventors: Michael F. Shone, Parsippany; Roger F. Belt, Morristown, both of N.J.

[73] Assignee: Litton Systems, Inc., Morris Plains, N.J.

[21] Appl. No.: 749,356

[22] Filed: Jun. 27, 1985

Related U.S. Application Data

[63] Continuation of Ser. No. 475,937, Mar. 16, 1983, Pat. No. 4,544,239.

[51] Int. Cl.$^4$ .................. H01L 21/265; G11C 19/08; C04B 35/40
[52] U.S. Cl. ...................... 29/576 B; 148/1.5; 148/175; 252/62.57; 350/376; 427/38
[58] Field of Search ............... 29/576 B; 148/1.5, 175; 350/376; 252/62.57; 427/38

[56] References Cited

U.S. PATENT DOCUMENTS

| | | | |
|---|---|---|---|
| 3,792,452 | 2/1974 | Dixon et al. | 427/38 |
| 4,018,692 | 4/1977 | Akselrad et al. | 252/62.7 |
| 4,333,991 | 6/1982 | Sakurai | 428/702 |
| 4,372,985 | 2/1983 | Bailey | 427/38 |
| 4,404,233 | 9/1983 | Ikeda et al. | 29/576 B |
| 4,434,212 | 2/1984 | Robertson et al. | 252/62.57 |
| 4,451,500 | 5/1984 | Gerard et al. | 427/38 |
| 4,476,152 | 10/1984 | Imura et al. | 427/38 |
| 4,532,180 | 7/1985 | Ohta et al. | 252/62.57 |
| 4,556,583 | 12/1985 | Imura et al. | 427/38 |

FOREIGN PATENT DOCUMENTS 2600959 7/1977 Fed. Rep. of Germany ... 252/62.57

OTHER PUBLICATIONS

North et al., J. Vac. Sci. Technol. 15(5) (1978) p. 1675.
Tanoue et al., in Ion Implantations in S/C, ed. Namba, Plenum, N.Y. 1978, p. 285.
Torok et al., IEEE-Trans. Magnetics, Mag. 14, (1978) p. 31.
Lacklison et al., IEEE-Trans. Magnetics, Mag. 11, (1975), p. 1118.

*Primary Examiner*—Upendra Roy
*Attorney, Agent, or Firm*—Michael H. Wallach; Robert F. Rotella

[57] ABSTRACT

The invention relates to a two step method of manufacturing a magnetically switchable magneto-optic element comprising compressed bismuth-containing garnet film of low anisotropy field value deposited on a monocrystalline gadolinium garnet substrate. The first step involves growing a compressed bismuth-containing garnet film having a growth and strain induced effective anisotropy field of about 3000 gauss or less on a monocrystalline gadolinium garnet substrate. The second step involves reducing the anisotropy field of the resulting garnet film to a predetermined lower anisotropy field by ion implantation.

12 Claims, 11 Drawing Figures

TWO-STEP METHOD OF MANUFACTURING COMPRESSED BISMUTH-CONTAINING GARNET FILMS OF REPLICABLE LOW ANISOTROPY FIELD VALUE

CROSS-REFERENCE TO RELATED APPLICATION

This is a continuing application of co-pending application Ser. No. 475,937 filed Mar. 16, 1983 now U.S. Pat. No. 4,544,239, published Oct. 1, 1985.

BACKGROUND OF THE INVENTION

1. Field of the Invention

The invention relates to the field of magnetic materials and more particularly composites comprised of epitaxial films possessing magnetically switchable states of magneto-optic rotation. The films are supported on monocrystalline non-magnetic garnet substrates.

2. Description of the Prior Art

Epitaxial garnet films of numerous compositions have been developed in the art which possess magnetic and/or magnetic-optic characteristics variously suitable for "bubble devices," magneto-optic detection and/or display devices.

The epitaxial films are generally grown on gadolinium gallium garnet (GGG) or other garnet substrates.

It is impossible to generalize and attribute properties to the composition of all such epitaxial films because many variables interplay in the achievement of desired magnetic/magneto-optic properties.

The variations observed in the formulae of epitaxial film layers do not require elaboration. The art is replete with examples of dramatic and unexpected changes achieved where ionic substitution is effected in epitaxial garnet films and/or where the quantity of one or more components of such films is varied.

Of utmost importance in epitaxial garnet film magnetic devices is the capability of replicating materials which have consistent magnetic properties.

One area where magnetic epitaxial films have found use is the bubble memory. Indeed, epitaxial films useful in the magnetic bubble area have been highly developed.

In bubble films, micron sized magnetic domains are propagated within the volume of contiguous garnet films. The bubbles are actually tiny islands of opposite polarization in the magnetic film layer. Patterns for the bubbles in the form of tiny chevrons define pathways and resting places for the bubbles and a rotating magnetic field causes the bubbles to move from chevron to chevron, thereby storing and retrieving digital data.

Such bubble materials have been formulated from bismuth-containing and rate earth ion containing single crystal strain-free garnet films on lattice matched non-magnetic garnet substrates wherein elevated levels of bismuth incorporation have increased Faraday rotation of the film material and, therefore, provided for optical detection of bubbles. See U.S. Pat. No. 4,018,692.

By reference to U.S. Pat. No. 3,886,533, among others, it is observed that in "bubble devices", domains have been achieved using two major approaches. The first approach involves growth induced anisotropy wherein a mixed population of selected ions at a given crystallographic site results in local strain and/or preferential ordering. The second approach involves the use of strain induced anisotropy, induced by a differential between lattice dimensions of the epitaxial layer and its substrate. Patentees note the advantages and disadvantages associated with each approach pointing out that the latter approach has the disadvantage of significant temperature dependence of magnetic properties of concern in device operation. Patentees also refer to the other and overwhelming problem associated with the existence of a lattice differential, namely, the occurrence of film cracking. The magnitude of the strain induced effect produced by a lattice differential is limited to prevent cracking. Indeed, the matching of epitaxial layer and substrate lattice dimensions is generally specified in the prior art in order to avoid cracking.

Regarding the matter of lattice matching, it must be added that the prior art also includes disclosure of selected epitaxial layer "bubble film" compositions, which in part, achieve their utility by virtue of lattice differential between epitaxial layer and substrate. Representative patents are: U.S. Pat. Nos. 3,886,533; 3,995,093; 4,002,803; 4,263,374; 4,138,530 and 4,169,189.

Finally, before leaving the "bubble film" area, it should be pointed out that yet another method of affecting the magnetic anisotropy of magnetic bubble film garnet materials involves ion implantation. See, e.g., U.S. Pat. No. 3,792,452 and the citations therein.

Epitaxial garnet films have also been used in switchable magneto-optic devices of the type for which the composites of the present invention are suitable. For example, in an article entitled FAST SWITCHABLE MAGNETO-OPTIC MEMORY-DISPLAY COMPONENTS, B., Hill et al., Philips J. Res. 33, 211–215, 1975, wherein magneto-optic iron-garnet films allowing fast switching of a pattern of domains are disclosed, switching is achieved by setting up temperature gradients; therefore, temperature sensitivity is a prerequisite of operation and hence stability of the magnetic properties of such a film is not desirable at the switching temperature of the Hill et al. device.

The present invention pertains to epitaxial films which are useable in magnetically switchabe magneto-optic devices similar to those disclosed by B. Hill et al. in their above-identified article entitled FAST SWITCHABLE MAGNETO-OPTIC MEMORY-DISPLAY COMPONENTS but having the advantage over the Hill et al. devices of being switchable without the need of setting up temperature gradients.

The epitaxial films of the present invention do not require temperature compensation or biasing magnetic fields for domain stability or switching. Rather the epitaxial films of the present invention represent a specific group of magnetic garnet materials possessing uniaxial anisotropy and meeting the condition that $H_k - 4\pi M_s > H_{sat}$.

The stability and non-thermal switching capability of epitaxial films meeting the conditions of $H_k - 4\pi M_s > H_{sat}$ was first disclosed by Pulliam et al. in an article entitled *Large Stable Magnetic Domains*, J. App. Phys. 53(3), 2754–8 1982.

The present invention relates to the discovery of a specific group of garnet materials, which meet the conditions $H_k - 4\pi M_s > H_{sat}$ and which are particularly suited for the production of switching elements and arrays of pixels suitable for use in a variety of magneto-optic devices.

SUMMARY OF THE INVENTION

It is the object of the present invention to provide a magnetically switchable magneto-optic element comprising a bismuth-containing iron garnet epitaxial film of high Faraday rotation which has a replicable controllable anisotropy field.

In bismuth-containing iron garnet films the anisotropy field is roughly proportional to the amount of bismuth incorporated into the film. This effect is believed attributable to spin orbit coupling of the outermost electrons of bismuth with the iron component. Accordingly, although films of high Faraday rotation are achievable by the use of high bismuth content in iron garnets, such films have also had the undesirable attribute of having a high anisotropy field.

Accordingly, it is another object of our invention to adjust the anisotropy field for a given content of bismuth by utilizing both growth-induced anisotropy by incorporation of one or more trivalent ions of negative magnetostriction constant in the (111) direction such as Gd, Sm, Tm, Dy, Ho, Er, Y, Yb or Lu into the film and by compression which is created by the lattice differential between film and substrate. The epitaxial film employed has a larger lattice constant that the substrate. The lattice differential may suitably be from about 0.005A to about 0.06A and is preferably greater than 0.017A.

It is yet another object to adjust the collapse field of the epitaxial film. The collapse field arises from the addition of the moments of the octahedral, tetrahedral and docecahedral sites and is a manifestation of the magnetization of the garnet at a particular temperature. To achieve a given collapse field value, an assessment is made of the amount of iron to rare earth needed for the particular mixed system melt which will form a film of selected formula. Such a film is then grown and its magnetization evaluated. Adjustments are then made, either by changing the iron content or changing growth temperature or the rate of substrate rotation during epitaxial layer formation depending on how any one or the combination of adjustments affects film growth rate and anisotropy of the film of selected formula.

One embodiment of the invention relates to a magnetically switchable magneto-optic element of high Faraday rotation comprising a monocrystalline gadolinium garnet substrate and an epitaxial film supported by said substrate which is nominally represented by the formula: $Bi_xM_{3-x-z}Q'_{z'}Fe_{5-y-z}Ga_yQ_zO_{12}$. In this formula, M is selected from the group consistng of Dy, Ho, Er, Tm, Yb, Ly, Y, Sm, Gd and combinations thereof; Q is selected from the group consisting of $Mn^{3+}$, $In^{3+}$, $Sc^{3+}$, $Sb^{3+}$, $Al^{3+}$, $Ge^{4+}$, $V^{5+}$ and combinations thereof; and Q' is a charge-balancing cation having a valence state lower than 3+ which is present when Q is comprised of a cation having a valence higher than 3+, Q' being present in an amount such that charge balance is maintained. Z can and does in many cases equal zero. Bismuth may be present in an amount up to about 1.9 atoms per formula and preferably in an amount up to 1.4 atoms per formula unit. Gallium may be present in an amount up to about 1.35 atoms per formula unit. The cations denoted by M may be present in an amount up to about 2.5 atoms per formula unit and the charge-balancing cations which are present only where tetra and/or pentavalent cations are included are present in an amount to maintain charge balance.

The cation denoted by Q' may be selected from mono- and divalent cations generally utilized to maintain charge balance where penta- and/or tetravalent cations are present in monocrystalline garnet materials, among such cations $Ca^{2+}$, $Mg^{2+}$, $Sr^{2+}$ and $Na^{1+}$ being the most frequently used to balance cations such as $Ge^{4+}$, $Si^{4+}$ and $V^{5+}$.

The films have measured magneto-optic properties including Faraday rotation of up to 1.4 deg/$\mu$m at 632 nm and 3.30 deg/$\mu$m at 546 nm; absorption coefficients ($\alpha$) of 650-800 cm$^{-1}$ at 632 nm and 1500-1700 cm$^{-1}$ at 546 nm; and figures of merit of about 4.5 deg/db at 632 nm and 4.9 deg/db at 546 nm. Low defect films of this type are suitable for switchable magnetic devices where coherent rotation ($H_k - 4\pi M_s$) is the governing initiating mechanism. Such films have a low $H_k$ of 1500-2000 Gauss, a $4\pi M_s$ of 50-150 Gauss, and collapse fields of 25-80 Gauss. Such films also have a high Curie point of 181° C.

The epitaxial film of the switchable magneto-optic elements of the present invention has three sublattice magnetizations which form a compensation point outside the temperature range of from about 243° K. to about 373° K.

As in all monocrystalline films, small quantities of uncompensated ions can be accommodated through the defect structure of the crystal lattice.

The films of the present invention having large lattice constants are grown on (111) large lattice substrates.

In a specific embodiment of the present invention an example of such a large lattice garnet epitaxial film has the nominal formula $Bi_xGd_yY_{3-x-y}Fe_{5-z}Ga_zO_{12}$ where $x \approx 0.8$, $y \approx 1.0$ and $z \approx 1.2$.

Among the suitable substrates for such films is 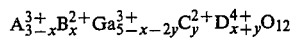.

Another group of suitable large lattice substrates is disclosed in GERMAN PATENT DISCLOSURE No. DE 30 08 706 A 1, published Mar. 7, 1980 and the corresponding United States equivalent, U.S. Pat. No. 4,379,853. Such rare earth metal gallium garnets have the following formula:

$$A^{3+}_{3-x}B^{2+}_xGa^{3+}_{5-x-2y}C^{2+}_yD^{4+}_{x+y}O_{12}$$

where the components are as follows:

| A | B | C | D |
|---|---|---|---|
| Gd | Ca | Mg | Zr |
| Sm | Sr |  | Sn |
| Nd |  |  |  |
| Y |  |  |  | and the values of x, y and x+y are:

$x > 0$ $y \leq 0.7$ $x + y \leq 0.8$

The formula enables the variation of lattice constant in rare earth gallium garnets while maintaining a distribution coefficient between melt and crystal of 1 (one). This is achieved by:

a. substituting alkaline-earth metal ions ($Ca^{++}$, $Sr^{++}$) for rare earth metal ions arranged on dodecahedral sites; and b. substituting for gallium ions in the octahedral sites; divalent $Mg^{++}$
tetravalent $Zr^{+4}$ and/or $Sn^{+4}$ In the magnetically switchable element of the invention the epitaxial film is in compression caused by lattice differential between substrate and epitaxial film; therefore, the epitaxial film has a lattice constant greater than the substrate.

The combination of the cations in the epitaxial film provides a net negative magnetostrictive coefficient. The anisotropy field of the epitaxial film has a positive value up to about 8,000 gauss, preferably up to about 4,000 gauss, more preferably within the range of from about 300 to about 3,500 gauss and most preferably from about 1,400 to about 1,600 gauss. The collapse filed of the epitaxial film has a positive value up to about 120 oersteds, preferably within the range of from about 20 to 90 oersteds and most preferably within the range of about 60 to about 80 oersteds. The epitaxial film possessed a high Faraday rotation generally at least about 0.7 degrees per micron at 632 nm.

The substrate supporting surface is suitably a polished plane along the (111) crystallographic plane, but may be along the (110) plane or other selected planes.

The film layer may be a submicron layer or may vary up to about 50 $\mu$m. The layer suitably may be from about 2 $\mu$m to about 20 $\mu$m in thickness and, typically is from about 2 $\mu$m to about 10 $\mu$m in thickness and, most preferably is within the range of from about 5 $\mu$m to about 8 $\mu$m in thickness. It is preferable that the thickness be substantially uniform and most preferable that the film be of uniform thickness varying less than $\pm 1.5\%$ in thickness.

Compression of the epitaxial film is achieved by providing a lattice differential of from about 0.006A to about 0.06A and most preferably from about 0.015A to about 0.045A. Suitably a lattice differential of 0.017A or greater is selected for the switching elements of the invention. Compression is achieved by making the film lattice constant larger than the substrate lattice constant.

To develop replicable procedures for obtaining the composite of the invention, the initial consideration is the Faraday rotation requirement. The Faraday rotation required defines the bismuth content, that is, for a garnet of given iron content, Faraday rotation is directly related to bismuth content. The bismuth content in turn produces the high anisotropy that must be adjusted by incorporation of ions of negative magnetostrictive coefficient and by compression adjusted to achieve a predetermined lower anisotropy field. Thereafter, the collapse field may be adjusted, suitably by varying iron content. In an empirical manner, the above process can be iterated several times to converge upon a desired set of properties.

Further, in accordance with applicants' invention, achieving a preselected anisotropy field is facilitated by a two-step procedure whereby an intermediate level is achieved by net negative magnetostrictive coefficient, epitaxial film compression and magnetization with the final adjustment of anisotropy field being achieved by ion implantation remote from the interface of epitaxial film and substrate.

The use of ion implantation is a well-known procedure for altering magnetic anisotropy as evidenced by reference to U.S. Pat. No. 3,792,452 and the literature therein referred to. In the present invention the procedure of ion implantation is particularly well suited to effect the final adjustment of anisotropy field after the initial anisotropy field adjustment based on growth and strain induces changes. It should be added that excluding the specific contributions of both growth induced and strain induced lowering of anisotropy field, ion implantation alone would not serve to affect reduction of anisotropy field without adverse effect to the crystalline material.

In considering the composites of the invention which are ion implanted, it should be noted that one of the essential parameters in the operation of a switchable magneto-optic device is that such device have an effective anisotropy field $H^*_k = H_k - 4\pi M_s$, where $H_k$ is the anisotropy field, $4\pi M_s$ is the demagnetizing field. This determines the amount of field necessary to switch the device by coherent rotation. Generally speaking, $H^*_k$ can most readily be brought into a suitable low operating range (300–400 Gauss) by ion implantation if the as grown film has a starting value of about 3000 gauss or less. In the prior art, lattice constant matched LPE films with low $H^*_k$ have generally had high collapse fields and vice versa. It has been thought that one would not be able to make sufficiently strained films to induce an in-plane anisotropy component to the desired lower $H^*_k$ because it had been demonstrated that stress relief dislocation networks are formed where the lattice constants of film and substrate were not closely matched. Bubble garnet films dislocate in this manner because of their high stiffness to elongation ratio and subsequently strain is transmitted throughout the crystal.

The Bi doped lanthanide garnet films of the present invention are suitably prepared by liquid phase epitaxy (LPE). These films are suitably deposited on (111) oriented gadolinium garnet substrates. In the process of the invention, very low temperatures are deliberately used for growth. By using growth temperatures in the vicinity of 700° C. lattice constants of the film, bigger than the substrate (compression) by as much as 0.06A° at a thickness of 15 $\mu$m can be used. Low growth temperatures suppress the formation of dislocations because insufficient energy is provided to shift the lattice the full distance of its Burger's vector. Enough stress can then be selectively induced to effectively lower $H^*_k$ from 10,000 Gauss anywhere down to zero. It has been discovered that this technique works regardless of whether the melt is leaded or unleaded or whatever other additives are in the melt.

The magneto-optic composite of epitaxial film on non-magnetic substrate is particularly well adapted for the production of magneto-optic wafers/chips. The epitaxial layer as more fully described hereafter by reference to the drawings can be made into a chip/wafer having a plurality of epitaxial layer pixels thereupon whereby the individual pixels can be independently switched.

Individual arrays comprised of multiple chips may be utilized in devices suitable for projection, instrumentation and cartographic applications. Sizes of the devices may vary from 10 cm$^2$ to 1,000 cm$^2$. The chips may be comprised of a plurality of pixels suitably having a length/width of about 25 $\mu$m to about 100 $\mu$m. Chips utilized in programable switches useful for fiber optics, switches, robotics, isolators, etc., may vary from 1 cm$^2$ to 10 cm$^2$ in size and be comprised of a plurality of pixels of relatively small size, that is, from about 5 $\mu$m to about 25 $\mu$m on a side. Individual chips or units comprised of multiple chips useful in the optical processing of signals or images may be of a size varying from 1 cm$^2$ to 100 cm$^2$ comprised of a plurality of pixels from about 5 $\mu$m to about 100 $\mu$m on a side. Individual chips or units comprised of multiple chips utilized in line or page printing devices may vary in size from 10 cm$^2$ to 1,000 cm². Such chips may be comprised of a plurality of pixels from about 10 μm to about 100 μm on a side.

Moreover, devices of sizes 5 to 10 cm² and 1 to 5 cm² comprised of pixels of relatively small size, are useful for optical memory and microwave processing devices, respectively. In the optical memory devices pixel sizes suitably may vary from about 1 to about 10 μm on a side.

The Bi doped lanthanide films of the present invention may suitably be used as optically active switchable elements of a light valve.

It is well known that in light valves/shutters employed in optical displays, optical information processing system, etc. enhancement of optical response and/or response rate is highly desirable. See e.g. U.S. Pat. No. 3,823,998. The specific bismuth-containing magneto-optic element of the present invention is particularly suited for use as the light rotating element of a light valve. The magneto-optic element of the present invention is switchable by x-y coincident drive lines and can be made with a preselected order of optical activity. The magneto-optic element of the present invention is, therefore, highly desirable for use in light valves where enhanced optical response and response rate are desirable.

In a specific embodiment of the aspect of the invention relating to switchable light valve devices, the switchable composite of the invention is utilized in chip format. The chip is comprised of a non-magnetic monocrystalline gadolinium garnet substrate which supports an array of epitaxial film pixels having x-y coincident drive lines associated therewith.

The switching elements of the present invention either as single elements or in the form of multiple arrays of epitaxial film pixels on monocrystalline gadolinium garnet can be used in high speed printers, light valves in projection display systems, direct view flat panel displays, optical memory devices, associative memory devices, Boolean algebra logical elements, vector matrix processing numerical elements, parallel array processors, real time spatial light modulators, scanning detector surfaces, and diffraction gratings for lasers.

DETAILED EXAMPLE OF THE INVENTION AND DETAILED DESCRIPTION OF THE DRAWINGS

Figure 1:
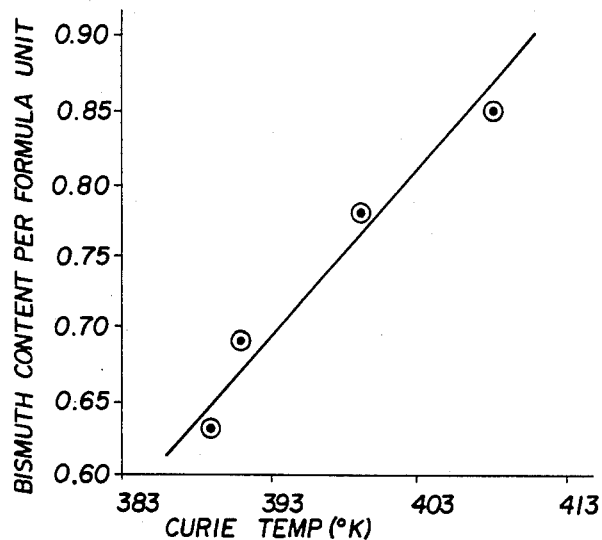
FIG. 1 is a graphic depiction of the relation between Curie temperature (Tc) and $x_{Bi}$.

As heretofore related in summarizing the present invention, in the procedure for obtaining the composite of the invention, the Faraday rotation requirement is generally first addressed. For a given iron content the Faraday rotation required defines the bismuth content. The bismuth content in turn produces the high anisotropy that must be adjusted by incorporation of ions of negative magnetostrictive coefficient and by compression adjusted to achieve a predetermined lower anisotropy field. Thereafter, the collapse field is adjusted, suitably by varying iron content. Thus, in preparing the switchable composite of the invention typically an assessment is made by the user regarding the magnitude of Faraday rotation required, which assessment in a sense predetermines the Bi content required. Since the growth induced anisotropy is directly related to Bi content, this parameter of the composite is in turn defined by the preselected Bi content. The increase of growth-induced anisotropy by Bi addition is a well known phenomenon. See e.g. most recently J. M. Robertson et al., J. Appl. Phys. 52,2338 (1981) and Luther et al., J. Appl. Phys 53(3) March 1982. The amount of compression needed to adjust the anisotropy to a desired value given the selected Bi content, can readily be calculated (this implies using magnetostriction). The collapse field of the resultant composite is then tested and adjusted by varying iron content of the composite. In an empirical manner, the foregoing procedure is repeated to converge upon a set of desired properties.

A more specific summary of the considerations and parameters relevant to achieving the requisite characteristics of the entire range of switchable composites of the present invention begins with the selection of an appropriate solvent.

Utilizing a suitable eutectic selected from among the eutectics enumerated in PHASE DIAGRAM FOR CERAMISTS (1969 Supplement), e.g., the eutectic of FIG. 2551, formed at about 594°, the added lanthanides of the present invention with negative magnetostrictive coefficients in the (111) direction, iron and gallium are added in quantities to produce a garnet phase precipitate.

The temperature is then raised to achieve complete dissolution of garnet forming components after which the temperature is lowered to achieve a metastable supersaturated condition.

A film is produced by introducing an appropriate substrate, the standard LPE technique including axial roation being used.

The film is examined by x-ray diffraction and the lattice constant of the film is assessed.

To achieve higher Faraday rotation the bismuth content of the crystal should be increased.

To achieve increased lattice constant, the temperature may be lowered, or rotation rate of the substrate increased, whereby the bismuth content of the crystal is increased or additional lanthanide or another larger lattice ion may be added.

After adjustment of lattice parameter producing a smooth epitaxial film surface, the film's magnetic characteristics are examined.

The required collapse field is obtained by adjusting magnetization which is achieved by varying the iron content of the melt. By increasing iron content the magnetization is increased (assuming no compensation point) and hence the collapse field is increased. To achieve a decrease in collapse field iron content is decreased or the temperature increased.

The anisotropy is next measured in tandem with measurement by x-ray diffraction to measure lattice constant. To adjust both collapse field and anisotropy within the desired ranges, the axial rotation rates of the substrate, the temperature of the melt and minor adjustments in solute content are made.

Regarding such minor adjustments, the addition of thulium increases growth rate as a consequence of which a higher amount of Bi and Fe are achieved in the crystal. This results in decreasing anisotropy and raising the collapse field.

If it is desired to simply raise the magnetization and therefore the collapse field without changing compression in film, iron would be added. A minor opposite adjustment causing lowering of magnetization and therefore collapse field is achieved by adding gallium. Compression, to a first order, is not effected by small iron or gallium additions.

In the Bi/Tm system utilizing the above-identified eutectic, in order to increase Faraday rotation, generally all that is needed is the use of a lower growth temperature.

Growth temperature for Yb (which also enhances Bi content) will be about 25° less than Tm and the ratio of Fe to Ga in the melt can be decreased because Fe is more favorably incorporated into the crystal at lower growth temperatures and higher growth rates. At lower temperatures higher growth rates are observed because saturation is increased.

Similarly, if Lu alone or Yb-Lu mixtures are used, one can lower the growth temperature of the melt and the Faraday rotation can be increased to the highest levels.

Melts developed as detailed above utilizing the preferred fluxes of the invention are described herebelow.

The preferable eutectic fluxes which have been frequently utilized to form the epitaxial layers of the present invention include $PbO/Bi_2O_3$ and $PbO/Bi_2O_3/B_2O_3$.

An example of the constituents of a suitable melt utilizing the $PbO/Bi_2O_3/V_2O_5$ eutectic flux is as follows:

|       | wt %  |
|-------|-------|
| PbO   | 66.20 |
| $Bi_2O_3$ | 27.40 |
| $Fe_2O_3$ | 4.69 |
| $Ga_2O_3$ | 0.93 |
| $V_2O_5$ | 0.45 |
| $Tm_2O_3$ | 0.33 |

The resultant epitaxial film had the following formula:

$Bi_{0.92}Tm_{2.01}Pb_{0.07}Fe_{3.86}Ga_{1.14}O_{12}$

The film was grown utilizing a growth/melt temperature of about 703° C. The film was grown on a 2" wafer of GGG having a lattice constant of 12.383. The wafer was rotated at 150 rpm, reversed at 10 second intervals.

Yet another example of the constituents of a suitable melt utilizing the $PbO/Bi_2O_3$ eutectic flux is as follows:

|       | wt %  |
|-------|-------|
| PbO   | 66.55 |
| $Bi_2O_3$ | 27.58 |
| $Fe_2O_3$ | 4.55 |
| $Ga_2O_3$ | 0.977 |
| $Y_2O_3$ | 0.077 |
| $Lu_2O_3$ | 0.27 |

The film was grown utilizing a growth/melt temperature of about 705° C. The film was grown on a 1" GGG wafer having a lattice constant of 12.383. The wafer was rotated at 150 rpm, reversed at 10 second intervals.

An example of the constituents of a suitable melt utilizing the $PbO/Bi_2O_3/B_2O_3$ eutectic flux is as follows:

|       | wt %  |
|-------|-------|
| PbO   | 65.59 |
| $Bi_2O_3$ | 27.15 |
| $B_2O_3$ | 1.31 |
| $Fe_2O_3$ | 4.44 |
| $Ga_2O_3$ | 1.08 |
| $Yb_2O_3$ | 0.430 |
| $Y_2O_3$ | 0.035 |

The film was grown utilizing a growth/melt temperature of 670° C. The film was grown on a 1" GGG wafer having a lattice constant of 12.383. The wafer was rotated at 150 rpm and reversed at 10 second intervals.

In the foregoing fluxes other cations and combinations of the specified cations of the lanthanide series called for in the present invention can be substituted for the Tm, or combinations of Y and Lu or Yb and Y.

In lieu of, or in combination with Ga, the cations Mn, In, Sc, Sb, Al, Ge, V may be used. Where Ge and/or V is used (occupying the tetahedral sites) then the preferred charge-balancing cation is Ca (occupying the dodecahedral sites); however, other charge-balancing cations, e.g., $Na^{1+}$, $K^{1+}$, $Mg^{2+}$, $Sr^{2+}$ can be used for like purpose. An example of such a film is the following Ca-balanced, Ge-containing films:

$Bi_{0.52}Y_{1.48}Ca_{1.00}Fe_{4.00}Ge_{1.00}O_{12}$

EXAMPLE

A series of about 200 $Bi_xTm_{3-x}Fe_{5-y}Ga_yO_{12}$ films were grown by liquid phase epitaxy onto 50 mm GGG substrates. Standard liquid phase epitaxial techniques were used to grow the films. The films were grown one at a time. The melts were composed of a 2.42:1 by weight eutectic of PbO and $Bi_2O_3$ along with $Tm_2O_3$, and $V_2O_5$ (0.45% by weight). No $B_2O_3$ was added. $V_2O_5$ was added to prevent crucible corrosion and provide for the lowest possible eutectic.

The temperature range of growth was from about 690° C. to about 730° C. This represented an average supercooling of about 90° as determined by extrapolation. Growth rates were approximately 0.4 μm/min. For growth near 730° C., $R_2$ ($Fe_2O_3/Ga_2O_3$)=6.01. At intermediate temperatures $R_2$=5.85, while for growth near 690° C. $R_2$=5.73. Using these $R_2$ values, $4\pi M_s$ was kept near 80 gauss. Film thicknesses were measured using an interferometer technique using visible light. The films had thicknesses of $7\pm1$ μm. Thickness uniformity across the substrate was $\pm0.1$ μm. Defect density averages 2/cm² as determined by mapping with an A.C. field.

Films made from these melts were quantitatively analyzed by atomic absorption (A.A.). Bi, Pb and Fe were analyzed with acetylene while Ga, Tm and V were analyzed with nitrous oxide/acetylene. It was assumed that for each formula unit there were three dodecahedral sites and five octahedral plus tetrahedral sites.

All of the films were in compression. They were not stress relieved or cracked. To ascertain the validity of the A.A. analysis the compressed lattice constants of the film $a_o$, found by x-rays were converted to the unstrained lattice constant $a_f$.

This was accomplished by utilizing the formula:

$$a_f = \frac{1}{1+\mu}[a\perp(1-\mu) + 2\mu a_s]$$

wherein: $\mu$ = Poisson's ratio = 0.29 and $a_s$; the substrate lattice constant is taken to be 12.383°A. For the calculated lattice constants, the work of Strocka et al. (B. Strocka, P. Holt and W. Tolksdorf, Philips J. Res. 186–202, 1978) was used. These results were modified to take into account octahedral site occupation of Tm at the growth temperature.

Table I, set forth immediately herebelow, presents analytical data for the range of films grown. Vanadium incorporation in the film was below the limit of detectability by A.A. and is therefore assumed to be less than 0.02 atoms per formula unit. Pb content varied between 0.07 and 0.08. An absorption coefficient measurement of 2200 cm$^{-1}$ at 546 nm is consistent with this quantity of Pb incorporation. The lead is assumed to enter as divalent and tetravalent cations. The exact ratio of these ions is unknown. It is likely that the discrepancy between the free lattice constant derived by x-rays and the calculated lattice constant derived by A.A. is due to nontrivalent ions.

rotation was similar to that seen in other Bi doped garnets. While $\theta_f$ does show a definite dependence on $X_{Bi}$ the resulting points again do not lie exactly on a straight line. The dispersion of data points is very similar to that seen for Tc vs. $x_{Bi}$. Similarly an iron/gallium distribution effect may be useful in explaining these inconsistencies.

The collapse field necessary for a magnetization calculation was derived from a stripe out measurement. With collapse fields of less than 35 gauss, it was found that the precision of any particular measurement was equal to 8%. Better precision was not possible because of domain pinning on defects and edges.

Figure 3:
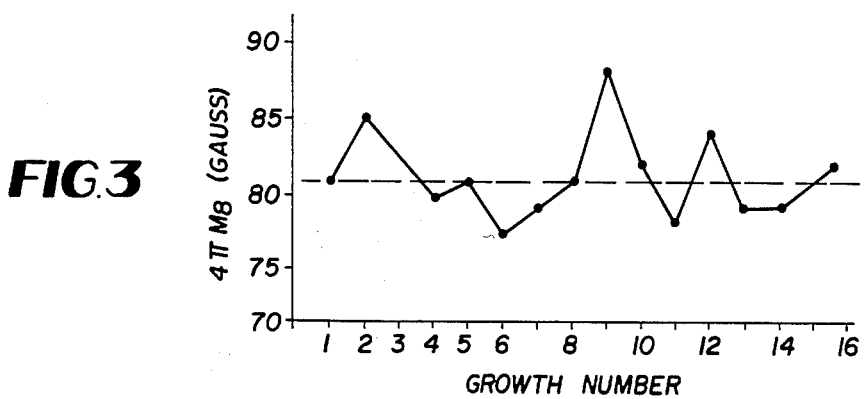
FIG. 3 is a graphic depiction of saturation magnetization replicability for a group of 15 consecutive films.

Referring to FIG. 3, the repeatability of $4\pi M_s$ over a group of 15 consecutive films is shown. The data demonstrate the manufacturability of low magnetization high Bi containing garnet films ($x_{Bi}$ near 0.85). The mean value of $4\pi M_s$ for these wafers is 81 gauss with a standard deviation of 3 gauss. Factors influencing repeatability include length of soak cycle, temperature ramping cycle and substrate orientation.

With low magnetization Bi films, measurement of $4\pi M_s$ becomes complicated by small property variations in the film. These variations are traceable to growth striations in the substrate and are caused by minute changes in the lattice constant across the substrate. Films shown in FIG. 3 were grown on substrates consecutive to each other in the original boule. Films were measured in the same spot (center) each time.

Finally, the uniaxial anisotropy field ($H^*_k = H_k - 4\pi M_s$) was measured by magneto-optic techniques. Data are collected by using both a $X^{-1}$ plot and direct observation of Faraday rotation disappearance. A.C. autocorrelator techniques were used in all cases. Kerr effect was used to check $H^*_k$ of the surface. The efficacy of the $H^*_k$ measurement in predicting actual device performance was within $\pm 15\%$.

Figure 4:
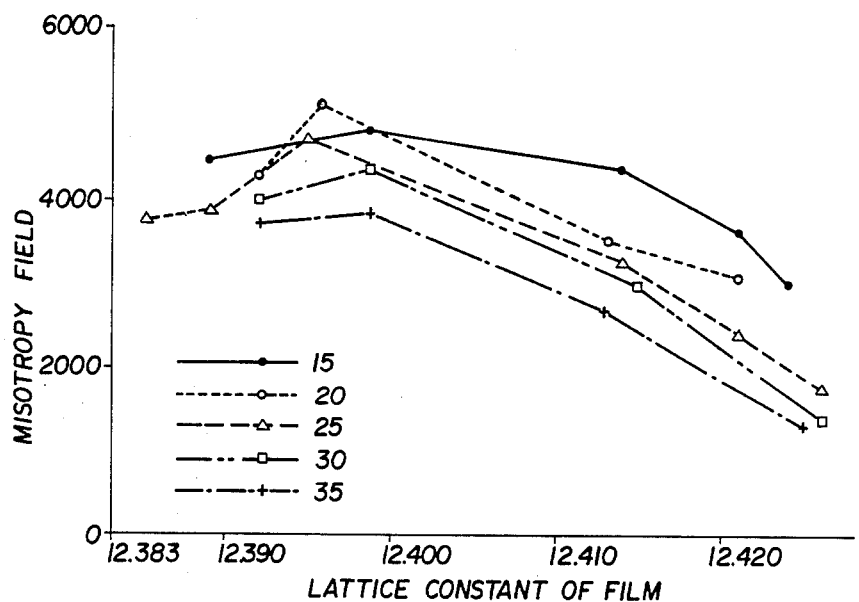
FIG. 4 is a graphic depiction of anisotropy field vs. lattice constant for five given collapse fields.

FIG. 4 presents data on $H^*_k$ for various values of the collapse field. In these films the anisotropy field rises until the film lattice constant ($a\perp$) is about 12.400°A. Increasing bismuth content (hence $a\perp$) would lead to higher anisotropies. However, the competitive reduc-

TABLE I

| | ANALYTICAL DATA FOR Bi—Tm GARNET FILMS | | | | |
|---|---|---|---|---|---|
| Sample | Calculated Formula Based On A.A. Analysis | $a_{Calc.}$ (Å) | $a_f$(Å) | $a\perp$ (Å) | Growth Temp |
| S1 | (Bi$_{.86}$Tm$_{2.07}$Pb$_{.07}$)[Tm$_{.14}$Fe$_{3.75}$Ga$_{1.11}$]O$_{12}$ | 12.400 | 12.404 | 12.421 | 709° C. |
| S2 | (Bi$_{.79}$Tm$_{2.16}$Pb$_{.07}$)[Tm$_{.14}$Fe$_{3.75}$Ga$_{1.11}$]O$_{12}$ | 12.391 | 12.394 | 12.402 | 716° C. |
| S3 | (Bi$_{.78}$Tm$_{2.15}$Pb$_{.07}$)[Tm$_{.14}$Fe$_{3.72}$Ga$_{1.14}$]O$_{12}$ | 12.390 | 12.393 | 12.401 | 730° C. |
| S4 | (Bi$_{.69}$Tm$_{2.24}$Pb$_{.07}$)[Tm$_{.14}$Fe$_{3.74}$Ga$_{1.12}$]O$_{12}$ | 12.383 | 12.390 | 12.396 | 730° C. |
| S5 | (Bi$_{.63}$Tm$_{2.30}$Pb$_{.07}$)[Tm$_{.15}$Fe$_{3.70}$Ga$_{1.15}$]O$_{12}$ | 12.375 | 12.385 | 12.387 | 724° C. |

1 The brace denotes ions on dodecahedral sites
2 The bracket denotes ions on tetrahedral and octahedral sites Reference to FIG. 1 shows the relation between Curie temperature (Tc) and $x_{Bi}$ (the bismuth content per formula unit). The generally low values of Tc are consistent with the iron composition. Changes in Tc with increasing $x_{Bi}$ support the concept that such changes are due to increased spin orbit coupling. The deviation of the points from a perfect straight line is most reasonably due to minor site occupation changes in Fe and Ga. This will affect sublattice exchange strengths.

Figure 2:
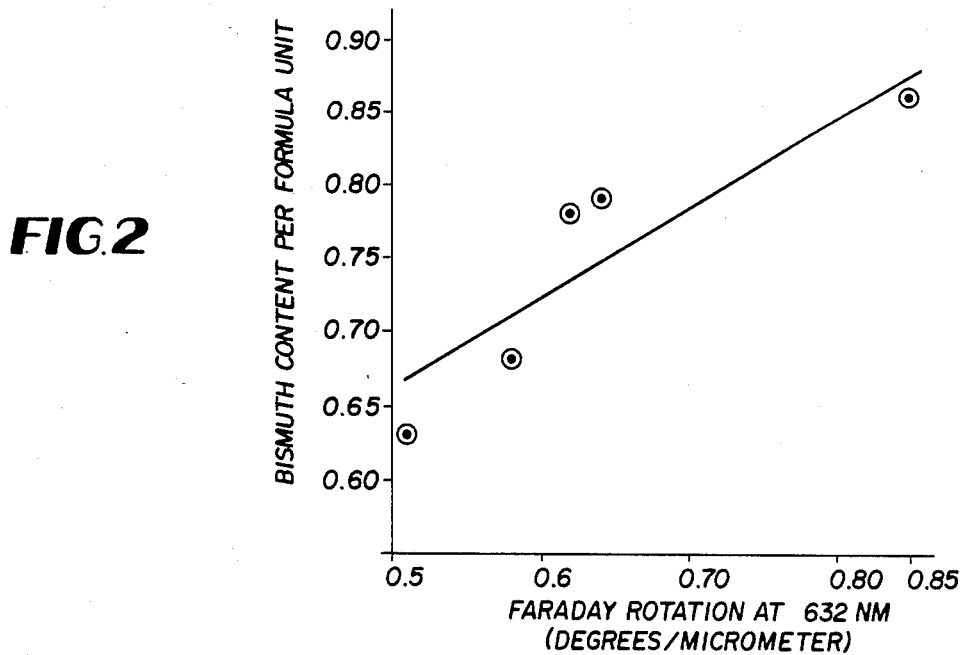
FIG. 2 is a graphic depiction of the direct relationship between Faraday rotation and bismuth content.

Referring to FIG. 2, Faraday rotations ($\theta_f$) were measured with a polarizing microscope taking care that no depolarizing elements were present in the optical path. FIG. 2 represents $\theta_f$ for samples S1–S5 at 632 nm. These values are representative of all composites grown. The wavelength dependence of the Faraday tion of anisotropy caused by the compressive mismatch operating through negative magnetostriction is such that wafers with a $\geq 12.435°A$ show only a weak magnetic linear birefringent pattern instead of the normal serpentine pattern. This signifies that the magnetization is lying randomly in the plane and $H^*_k$ is effectively zero.

Cracks and defects in these films were suppressed by low temperature growth thereby effecting manufacture under conditions which do not provide the thermal energy needed to initiate lattice slippage. Thermal annealing of these materials at about 850° C. causes great numbers of stress relief defects to form. Films of up to 20 μm have been grown with $a=a\perp-a_s$ of 0.06°A, which are essentially dislocation and crack free.

DETAILED DESCRIPTION OF THE DRAWINGS

The composite of the present invention is suitable for use in magneto-optic chips and displays.

Figure 5:
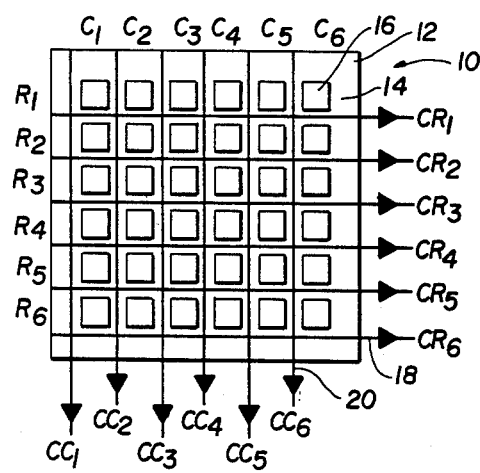
FIG. 5 is a simplified view of a conventional magneto-optic chip showing the rows and columns of the posts thereof as well as the matrix of control wires connected to provide individual addressibility of the posts which form the pixel positions.

A typical chip is shown in simplified form in FIG. 5. The chip, generally indicated as 10, comprises the substrate of the invention 12 having the film of the invention 14 on its surface. The magnetized film imposes the Faraday effect on polarized light passing therethrough. The film 14 is divided into individual pixel areas or posts 16. Typically, the posts 16 are laid out in a rectangular pattern of columns and rows such as those labelled for convenience as C1–C6 (for column 1 through column 6) and R1–R6 (for row 1 through row 6, respectively). A series of row control wires 18 and column control wires 20 are disposed between the posts 16 as shown in FIG. 5.

To make the composite of the invention into a chip, the exposed surface of the epitaxial film is just coated with $SiO_2$ (top only) by chemical vapor deposition (CVD) at 725° C. or lower. Photoresist is placed on top of the $SiO_2$ coating. The photoresist is exposed through a mask that defines the pixels. The photoresist and $SiO_2$ are etched through where exposed. Exposed garnet is etched with $H_3PO_4/H_2SO_4$, 50/50 by volume at a temperature of about 150° C. The remaining $SiO_2$ is removed with HF. Then a gold layer is placed over the pixel surface. Thereafter the pattern for ion implant is: $Ne^+$ at 200 Kev $4-5/10^{13}$ ions/sq. cm. Where a strain gradient is desired multiple implants may be used. The gold is removed and a new layer of gold layed down to pattern for the first drive line. Then a layer of polyimide is put on top for insulation and the second conductor is put down. Finally paths are opened in the first drive line layer so connectors can be made. After testing for continuity of resistance bonding to an outside drive circuit can be effected.

Figure 6:
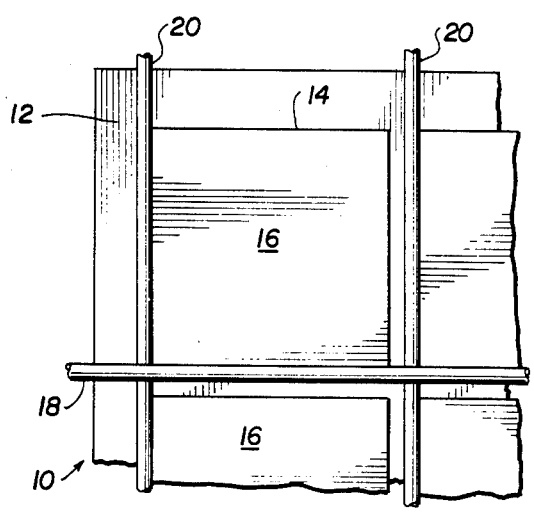
FIG. 6 is an enlarged drawing of a single post areas on the chip of FIG. 5.

For convenience, the row control wires 18 are located as CR1–CR6 (for control row) while the column control wires 20 are similarly labelled CC1–CC6 (for control column). The single post (pixel) 16 for column 1, row 1 (C1, R1) is shown greatly enlarged in FIG. 6. By control of the current direction in CR1 and CC1, the film 14 of the post 16 of FIG. 6 can be magnetized into the post 16 as FIG. 6 is viewed or magnetized out of the post 16 of FIG. 6 as it is viewed.

Figure 7:
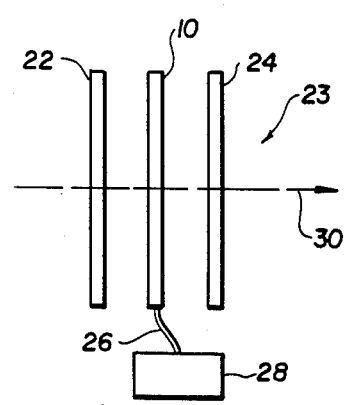
FIG. 7 is a simplified side view of a display chip showing its conventional mode of operation.

In FIG. 7, a typical display system incorporating the chip 10 of FIG. 5 is indicated as 23. Chip 10 is placed between a polarizer 22 and a polarization analyzer 24. The wires 18 and 20 used to address the chip 10 are contained within the cable 26 connecting the chip 10 to the display driver 28. The display drives 28 directs current through the wires 18, 20 so as to magnetize the various posts (pixels) 16 in a manner to effect a display pattern throughout the posts 16 of chip 10. Light 30 passing through the polarizer 22 is polarized by the Faraday effect accoring to the display pattern impressed into the posts 16 of chip 10 by the display driver 28. Light 30 then passes through the polarization analyzer 24. The amount of light passing through the analyzer 24 is a function of the $\cos^2\theta$ of the angle $\theta$ of polarization of the light 30 with respect to the polarization axis of the analyzer 24.

The fast switchable material of the present invention, most suitably in the form of a wafer having a plurality of pixels preferbly of 25–100 μm size, can be used in a line or page printer to form an image on a suitable recording medium. The recording medium may be thermographic paper. Alternatively, the image may be projected upon a thermomagnetic recording medium so as to induce in the thermomagnetic sensitive medium a retained pattern corresponding to the image pattern. From the thermomagnetic recording medium, the retained pattern may be transferred to a further recording medium by the process of magneto-xerography.

As will be noted at once, the image forming system of the invention, when used in an optical printer, obviates the need for character masks, and switches generally required in the optical printers of the prior art.

Figure 8:
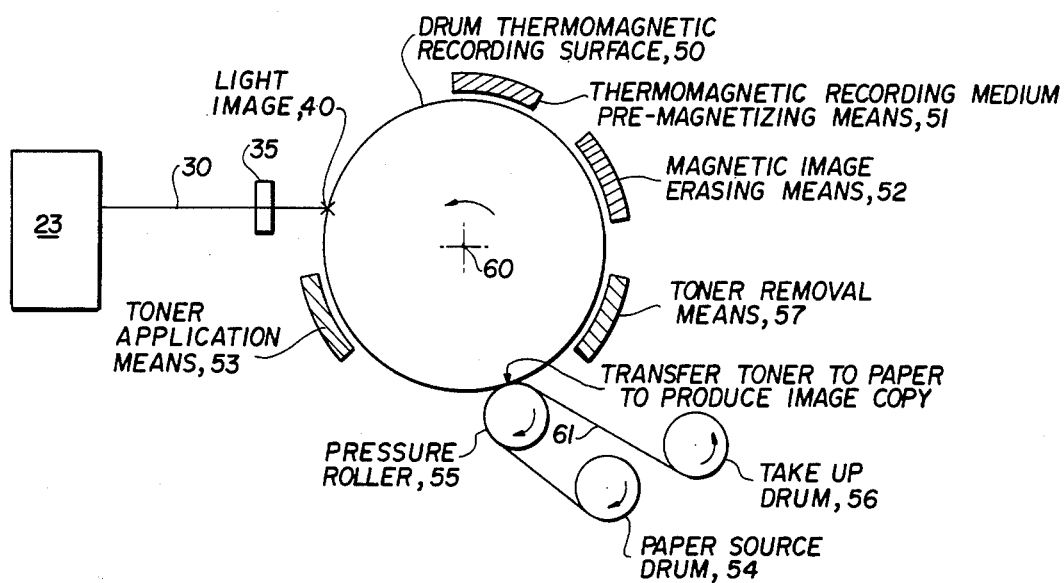
FIG. 8 is a pictorial diagram of a recording device employing a thermomagnetic recording system.

In the embodiment of the invention shown in FIG. 8, the drum 50 having a thermomagnetic sensitive surface accepts image 30. The diameter of the drum should be large enough relative to the projected image to accept the image directly without distortion, otherwise a distortion correcting lens 35 may be interposed in the optical path between the image forming system 23 and the drum thermomagnetic recording surface. The thermomagnetic recording arrangement includes the drum 50 which is driven by a suitable rotational drive mechanism (not shown) counterclockwise about axis 60. Disposed adjacent to drum 50 is premagnetizing head 51, suitably a retractable permanent magnet or d.c. electromagnet which magnetizes the magnetic material of the thermomagnetic sensitive surface of drum 50. An appropriate temperature bias source, such as a heating lamp, positioned adjacent premagnetizing head 51 or located within drum 50, may be provided. A suitable erase head 52 is disposed clockwise of premagnetizing head 51 to controllably erase any magnetic image stored on drum 50, so that a new image may be recorded. Light 30 from image forming system 23 passes through corrective optics 35, impinges at surface area 40 and thermomagnetically induces an image corresponding to the pattern on chip 10 of image forming system 23 in the sensitive recording surface of the drum 50. The magnetic image stored on drum 50 then passes a magnetic toner applying element 53, such as described, e.g., in U.S. Pat. No. 3,698,005. Excess toner is removed, by a suitable air knife. The toner image is conveyed to an image transfer mechanism including a paper source drum 54, resilient pressure roller 55, and take-up drum 50. Drum 54 and roller 55 rotate in a clockwise direction while take-up drum 56 rotates in a counterclockwise direction. Transfer of the toner image on drum 50 to paper 61 takes place as the paper 60 travels over roller 55 at which time it is brought into contact with the surface of drum 55. After one complete copy of the image pattern stored in drum 50 has been transferred to paper 60, a suitable toner remover mechanism 57, such as rotary bristle brush, removes toner particles not transferred to paper 70, to clean the surface of the drum. The image pattern is erased by erase head 52 to prepare the drum to receive a new thermomagnetically induced image.

Figure 9:
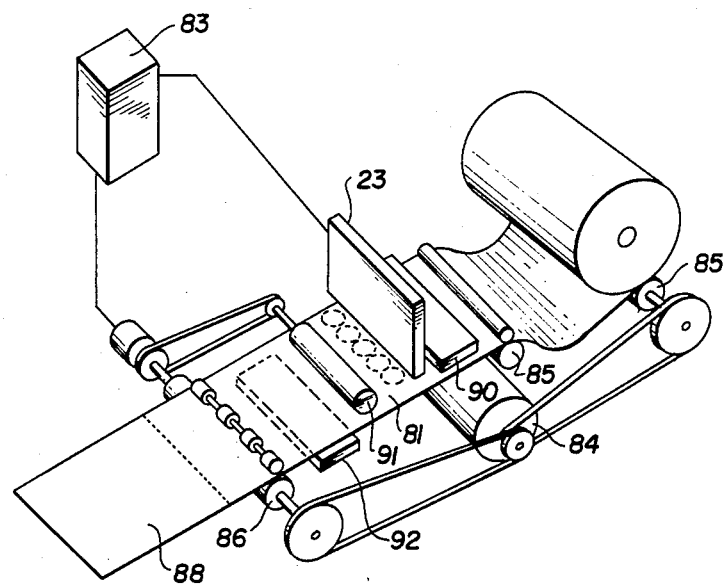
FIG. 9 is a perspective view of a printer wherein switchable magneto-optic element(s) of the invention may be used for high speed printing.

FIG. 9 is a schematic view showing the operation of an optical printer utilizing an array of pixels comprised of the magneto-optic material of the invention in the image forming system 23 which is shown. Image forming system 23 is connected to controller 83 and situated to provide an image on the surface of photo-sensitive medium 81. The light beam is directed to the desired position on the photo-sensitive medium 81. For this purpose a character/line positioner (not shown) may be used.

The photo-sensitive medium 81 is carried by rollers 85 and 86 operated by motor 84. The photo-sensitive medium 81 can be cut into page size sheets 88 after the characters have been imprinted thereon. An electronic unit 83 provides the necessary control signals for operating the light source, switching and the mechanical transport of the photo-sensitive medium.

The photo-sensitive medium used with this printer can be any medium which will provide a fixed image on exposure to light, such as photofilm or photo-conductive paper. Alternatively, thermally sensitive paper may be used.

In the described printer photo-conductive paper is used. This paper is charged at charge station 90 before the light beam strikes the paper. The effect of the light beam is to discharge the paper wherever the beam strikes the paper. The charge image on the paper is developed by the application of a toner at developing station 91. This toner is fixed by heat applied at fix station 92.

As will readily be appreciated in image forming system 23, the printing capability; that is, character, word, line or multiline recording of information is determined by the pixel array selected. Chips/wafers of sizes from about 10 to about 1,000 cm$^2$, having pixels suitably from about 10 $\mu$m to about 100 $\mu$m, allow for copying/printing lines or pages of characters. Of course, the characters depicted on the wafer may be changed each switching sequence; therefore, a single chip of suitable size can develope any variety of characters, lines or pages.

The rapid switching capabilities of image forming system 23 are such that reproducing speed is in essence limited only by the capabilities of the recording medium.

Figure 10:
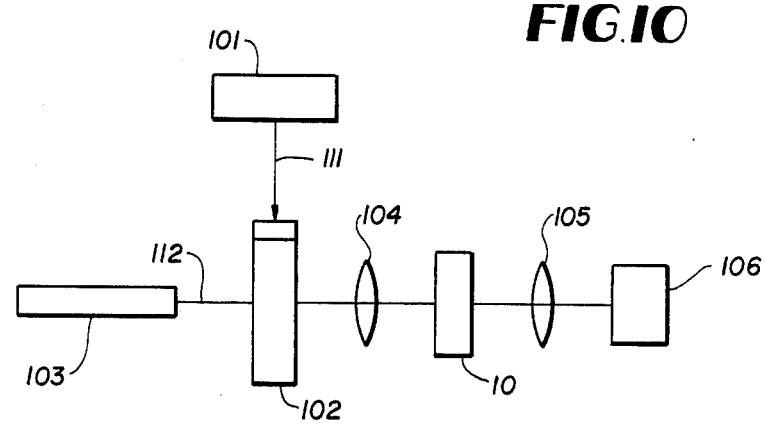
FIG. 10 is a simplified side view of a microwave signal processing device.

In FIG. 10, a microwave signal processing unit is schematically illustrated. A microwave source 101 providing gigahertz (GH$_z$) frequency radiation denoted by numeral 111 is utilized as an input to an acousto-optic Bragg cell 102. Laser light 112 from laser light source 103 is diffracted through the acousto-optic Bragg cell crystal as a function of the microwave frequency and amplitude. A detector/receiver 106 is situated to receive light 112 which has passed through acousto-optic Bragg cell device 102. Chip 10, comprising a plurality of independently switchable pixels (See FIG. 5 for detail), is interposed between acousto-optic Bragg cell device 102 and detector/receiver 106. The detector/receiver 106 may comprise a photocell or photodiode converting light to an electrical signal which can be analyzed to characterize amplitude and frequency of the microwave signal. Chip 10 can be used to block or pass portions of the light passing through Bragg cell device 102. In detector 106, signals are separated as a function of microwave frequency. As is apparent, chip 10 functions as Fresnel or Fourier transformer of the input amplitude. Lens 104 intermediate the acousto-optic Bragg cell 102 and chip 10 and lens 105 intermediate chip 10 and detector/receiver 106 are used to focus and direct the image carrying laser light to the chip and detector/receiver respectively. Specific applications of the signal processing unit include RF spectrum analysis, pattern recognition and signal blocking/filtering.

Figure 11:
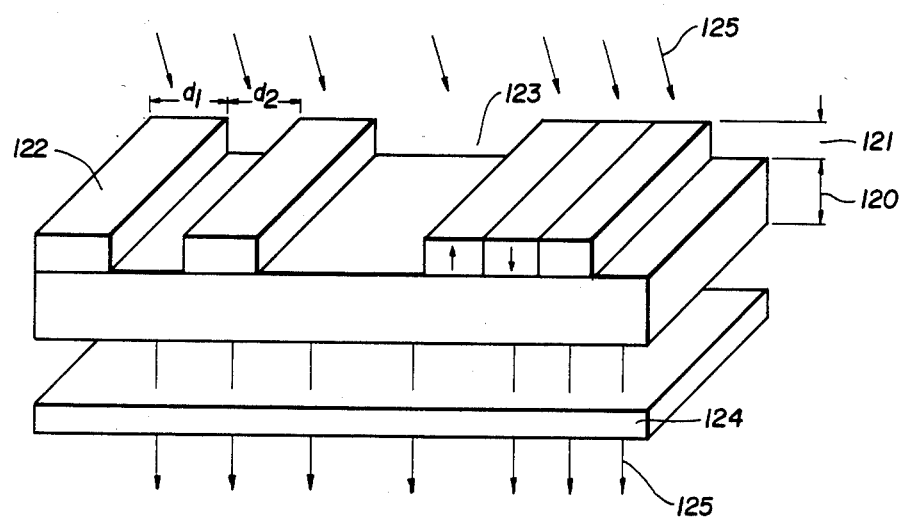
FIG. 11 is a simplified perspective view of a magneto-optic light deflector.

In FIG. 11, a magneto-optic light deflector is illustrated. In this embodiment of the invention the epitaxial layer 121 comprises parallel linear arrays of the epitaxial film 122 arranged either contiguous to one another or with an intervening space 123 therebetween. The aligned parallel stripes of epitaxial film 122 are supported on a non-magnetic monocrystalline garnet substrate 120. In the drawing d$_1$ and d$_2$ are used to denote the periodic striped domains formed by the aligned parallel strips of film 122 and the intervening spaces between such parallel striped domains respectively. The intervening spaces may be light transmitting or may be made light reflecting/absorbing/blocking. Indeed where the spaces are not light transmitting the switching circuitry for the parallel strips may be carried in such spaces, e.g., the spaces d$_2$ may be filled in with a conductor which blocks the passage of light. The arrows placed within the forward end of the parallel strips of film are used to denote the direction of oppositely magnetized domains.

Polarized light, generally introduced at an angle relative to the surface of the parallel linear epitaxial stripes and substrate, is diffracted as a consequence of periodic variations in amplitude or phase of such incoming light. The domain arrays introduce a periodic 180° phase change through magnetic birefringence. The light passing through the substrate in turn is passed through the analyzer 124.

As with other illustrated arrangements utilizing the switchable magneto-optic elements of the present invention, it is possible to use a bias field to enhance switching by reducing the demands on the magnetic field generated by the conductors utilized for switching.

Magneto-optic light deflectors utilizing the magneto-optic elements of the present invention can be used for light deflection switching lens formation and image processing where operated in the transmissive mode.

The arrangement of FIG. 11 can be used in either the transmissive or reflective mode. In the reflective mode the Kerr effect is utilized.

As is evident from the foregoing, various modifications are possible and can be made without departing from the spirit of the invention. It is not intended to limit the invention to the details heretofor recited, the invention being defined in the claims which follow.

We claim:

1. A two-step method of manufacturing a magnetically switchable magneto-optic element comprising compressed bismuth-containing garnet film of low anisotropy field value on a monocrystalline gadolinium garnet substrate, which method comprises:
   (a) first, growing a compressed bismuth-containing garnet film on a monocrystalline gadolinium garnet substrate, said garnet film having a growth and strain induced effective anisotropy of about 3000 gauss or less;
   (b) and then, reducing the anisotropy field of the as-grown garnet film in step (a) to a preselected lower anisotropy field by ion implantation remote from the interface of said film and substrate.

2. The method of claim 1 wherein the anisotropy of the garnet film grown in step (a) is reduced by ion implantation remote from the interface of said film and substrate to a range of from 300 to 400 gauss.

3. The method of claim 1 wherein the compressed bismuth containing film is from about 2 $\mu$m to about 20 $\mu$m in thickness.

4. The method of claim 2 wherein the compressed bismuth containing film is from about 2 $\mu$m to about 20 $\mu$m in thickness.

5. The method of claim 1 wherein the compressed bismuth containing film is from about 5 μm to about 8 μm in thickness.

6. The method of claim 2 wherein the compressed bismuth containing film is from about 5 μm to about 8 μm in thickness.

7. The method of claim 1 wherein the strain induced anisotropy is produced by growing a bismuth garnet having a film lattice constant of from about 0.015A to about 0.045A larger than the lattice constant of the substrate.

8. The method of claim 2 wherein the strain induced anisotropy is produced by growing a bismuth garnet having a film lattice constant of from about 0.015A to about 0.045A larger than the lattice constant of the substrate.

9. The method of claim 3 wherein the strain induced anisotropy is produced by growing a bismuth garnet having a film lattice constant of from about 0.015A to about 0.045A larger than the lattice constant of the substrate.

10. The method of claim 4 wherein the strain induced anisotropy is produced by growing a bismuth garnet having a film lattice constant of from about 0.015A to about 0.045A larger than the lattice constant of the substrate.

11. The method of claim 5 wherein the strain induced anisotropy is produced by growing a bismuth garnet having a film lattice constant of from about 0.015A to about 0.045A larger than the lattice constant of the substrate.

12. The method of claim 6 wherein the strain induced anisotropy is produced by growing a bismuth garnet having a film lattice constant of from about 0.015A to about 0.045A larger than the lattice constant of the substrate.

* * * * *